(12) United States Patent
Alon

(10) Patent No.: US 6,473,027 B1
(45) Date of Patent: Oct. 29, 2002

(54) FALSE REFLECTED TARGET ELIMINATION AND AUTOMATIC REFLECTOR MAPPING IN SECONDARY SURVEILLANCE RADAR

(75) Inventor: Yair Alon, Thousand Oaks, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 3 days.

(21) Appl. No.: 09/859,120

(22) Filed: May 15, 2001

(51) Int. Cl.[7] .............................................. G01S 13/00

(52) U.S. Cl. ......................................... 342/37; 342/36

(58) Field of Search .............................. 342/36, 37, 40, 342/105, 113, 159, 160, 161

(56) References Cited

U.S. PATENT DOCUMENTS

| | | | | |
|---|---|---|---|---|
| 5,107,268 A | * | 4/1992 | Sturm et al. | 342/32 |
| 5,877,721 A | * | 3/1999 | Tsang et al. | 342/36 |
| 5,990,824 A | * | 11/1999 | Harrison | 342/159 |

* cited by examiner

Primary Examiner—Thomas H. Tarcza
Assistant Examiner—Brian Andrea
(74) Attorney, Agent, or Firm—Lynn & Lynn

(57) ABSTRACT

A method for eliminating signals from false targets in a secondary surveillance radar system includes the steps of obtaining plots of radar data for the same target. The range from the radar system to the targets is determined, and the target plot having smallest range of all target plots that indicate reflection of radar signals from the same target is accepted as being a real target. Other target data is rejected as being from a radar reflector. The coordinates of radar reflectors may be stored in a database to form a map of reflectors in the vicinity of the radar.

17 Claims, 11 Drawing Sheets

FALSE REFLECTED TARGET ELIMINATION AND AUTOMATIC REFLECTOR MAPPING IN SECONDARY SURVEILLANCE RADAR

BACKGROUND OF THE INVENTION

This invention relates generally to techniques for using secondary surveillance radar to identify and determine the location of a target such as an aircraft. More particularly, this invention relates to techniques for distinguishing real targets from reflected targets and for generating a map of all radar reflector objects in the secondary surveillance radar region.

An air traffic control radar system typically includes a primary surveillance radar system and a secondary surveillance radar (SSR) system. Both systems can determine the range and direction of an aircraft from the radar installation. A secondary surveillance radar system, however, can also identify each aircraft using a specific code reported by that aircraft.

The primary and secondary radar systems can be either collected to operate together, or they may operate autonomously. The primary surveillance radar system uses a primary antenna mounted on a tower to transmit electromagnetic waves. The primary antenna rotates continuously to scan a selected surveillance region. These electromagnetic waves are then reflected or "bounced back" from an object (such as an aircraft). This reflected signal is then displayed as a "target" on the air traffic controller's radarscope. The primary surveillance radar system measures the time required for a radar echo from the aircraft to return to the primary radar antenna. The primary surveillance radar system also measures the direction and height of the echo from the aircraft to the primary radar antenna. Secondary surveillance radar was originated in WWII to add the capability of distinguishing friendly aircraft from enemy aircraft by assigning a unique identifier code to the friendly aircraft. The system was initially intended to distinguish between enemy and friend but has evolved such that the term "identify friend or foe" (IFF) commonly refers to all modes of SSR operation, including civil and foreign aircraft use.

The secondary surveillance radar system, also known as beacon radar, uses a secondary radar antenna. In most installation when the two radar systems are co-located, this secondary antenna is attached to the primary radar antenna. However, the SSR system can operate in an autonomous installation where the SSR system is used for the radar surveillance task. The SSR antenna is used to transmit the interrogation calls and to receive the aircraft data. Military and commercial aircraft have transponders that automatically respond to a signal from the secondary surveillance radar interrogation with an identification code and altitude. The code is a predetermined message in response to a predefined interrogation signal. Before an aircraft begins a flight, it receives a transponder code from an air traffic controller. Normally only one code will be assigned for the entire flight. These codes are sometimes called mode codes. The range to the target is calculated from the time delay between the interrogation and the response time. Thus the SSR system provides for friendly aircraft, all the data that primary radar can provide, and more.

There are five major modes of operation and one sub-mode currently in use in the United States. Mode 1 is a nonsecure low cost method used by ships to track aircraft and other ships. Mode 2 is used by aircraft to make carrier-controlled approaches to ships during inclement weather. Mode 3 is the standard system used by military and commercial aircraft to relay their positions to ground controllers throughout the world for air traffic control (ATC). Mode 4 is used for secure encrypted IFF. Mode "C" is the altitude encoder. Mode S is a new IFF procedure for both military and civilian air traffic control that includes transmission of other data in addition to the mode code. The non-secure codes are manually set by the pilot but assigned by the air traffic controller.

A secondary surveillance radar system includes three main components: an interrogator, a transponder and a radarscope. In an air traffic control radar system, the interrogator, a ground based radar beacon transmitter-receiver, scans in synchronism with the primary radar and transmits discrete radio signals that repetitiously request all transponders on a selected mode to reply. The replies received are then mixed with the primary returns, and both are displayed on the same radarscope.

The transponder on an aircraft has an omni-directional antenna so that it can receive and reply to a radar signal from any direction. The transponder receives the signals from the interrogator and selectively replies with a specific pulse group (code) only to those interrogations being received on the mode to which the transponder is set. These replies are independent of primary radar returns, which are received from the target "skin" return. The replies processed by the SSR interrogator for display are sometimes called "plots." The radarscope used by the controller displays returns from both the primary radar system and the secondary radar system. These returns are what the controller refers to in the control and separation of air traffic.

It is known that the secondary surveillance radar (SSR) suffers from a target reflection problem where a single target may be reported in several directions during one antenna scan. Only one position is the correct one for the target, and the others are "phantom" images that confuse the radar operator. Ground objects that act as electromagnetic "mirrors" reflect the electromagnetic wave to the target and back to the SSR system generate these reflections. These reflector objects can be comprised of any electrically conductive material located in the proximity of the radar site (buildings, hangars, metallic fences, etc.). The problem is much more significant in an SSR system than in primary radar. The SSR transponder generates a high signal level that is not sufficiently attenuated by the interrogator one-way receiving antenna. The primary radar skin return is much weaker, attenuated faster as a function of radar range and is attenuated by the two-way antenna beam (versus one-way antenna beam of the SSR system). In some typical test conducted the number of SSR false reports can be as high as 30% of the total target reports.

The false target is generated when the SSR directional radar antenna is pointed at a reflector object rather than to the real target. The interrogator signal is reflected from the reflector object that acts as a mirror, toward the real target. The transponder in the target emits signals in all directions including the direction of the ground reflector. This signal is now reflected back from the same reflector back toward the SSR system resulting in a false target reported at the direction of the ground reflector. As a result, a target may appear on the radar screen in all azimuths where ground reflectors exist. To make the situation more complicated, unlike in primary radar systems where the ground reflectors are mapped by the radar surveillance, they are not visible by the SSR system, which responds only to active target code reports.

Although current SSR systems contain processes to reduce the number of false target reflections, the final results are not satisfactory. Receiver gain reduction at shorter range, Gain Time Control (GTC), may reduce the number of false targets at short ranges (at the expense of height coverage at those ranges). There is a false target rejection algorithm that requires complete mapping of all reflectors in the surveillance area including their electromagnetic properties. This is a very time-consuming task, with limited accuracy and will not provide a solution for the case where reflectors are dynamically changed (car on the road, new structures built or reflection conditions change due to changes in electromagnetic properties). An automatic technique that rejects all false targets and required no prior knowledge of the reflectors in the surveillance area is presented in this invention.

SUMMARY OF THE INVENTION

One aspect of the present invention identifies and rejects all secondary surveillance radar (SSR) plots reported from a reflected target without the need for prior knowledge of the locations of reflector objects in the surveillance region. Another aspect of the invention identifies and maps all reflector objects in the surveillance region using only targets that are present in the surveillance region. The present invention provides reliable identification of real targets, while eliminating the need for costly and lengthy flight tests and a site survey currently required for SSR radar installation.

A method according to the invention for identifying false target signals on a radar display caused by reflection of radar signals from a reflector object in a surveillance region using a radar system that includes a radar interrogator comprised of a radar transmitter/receiver arranged to display plots of radar signals that indicate positions of targets in the surveillance region, comprises the steps of obtaining a first plot of radar data for target position at a first time and obtaining a second plot of radar data for target position at a second time. The first and second plots of radar data are compared to determine whether they represent multiple reports of a single target or whether they represent different targets. The method also includes the steps of determining a first range from the radar interrogator for the first plot of radar data if the first and second plots of radar data represent multiple reports of a single target and determining a second range from the radar interrogator for the second plot of radar data if the first and second plots of radar data represent multiple reports of a single target. The first and second ranges are compared to determine which has the larger magnitude with the larger magnitude; and the plot of radar data having the larger range is identified as being a false target signal.

The step of comparing the first and second plots of radar data may comprise the steps of subtracting the first time from the second time to obtain a time difference for the first and second plots of radar data, calculating a target velocity for the second plot of radar data; and using the target velocity of the second plot of radar data and the time difference to propagate the range for the second plot of radar data to the same time as the first plot of radar data.

The invention may further include the steps of subtracting the first range from the second range to determine a range difference, comparing the range difference to a threshold, and identifying the second plot of radar data as being a false target signal if the range difference exceeds the threshold.

The invention may also further include the step of processing signals input to the radar display to block false target signals that have been identified.

The invention may include calculating a range of the reflector object from the radar interrogator. The method may also include calculating a facing angle of the reflector object relative to the interrogator as a function of the azimuth, range, and altitude measurements. The invention may include storing the range of the reflector object from the interrogator and the facing angle of the reflector object in a database.

DETAILED DESCRIPTION OF THE INVENTION

General Process

The present invention includes four basic processes. First, radar data is used to determine a velocity for a new target. The velocity used with a time interval to propagate the target ranges to a time when range measurements were made. Second, target ranges referenced to the same time are used to identify reflected targets. Third, the invention maps locations of all radar reflector objects in the selected surveillance region and fourth, a facing angle for each reflector object is determined.

The present invention performs its task with substantially no delay. However, processing delay may still be present. Processing delay is a function of the computer (not shown) used in the radar system and its load factors. The present invention eliminates, in substantially real time, reflected targets prior to display or track initialization on the radarscope and maps reflector objects in the surveillance region. The invention therefore enables an air traffic control radar system to display only real targets.

Figure 1A:
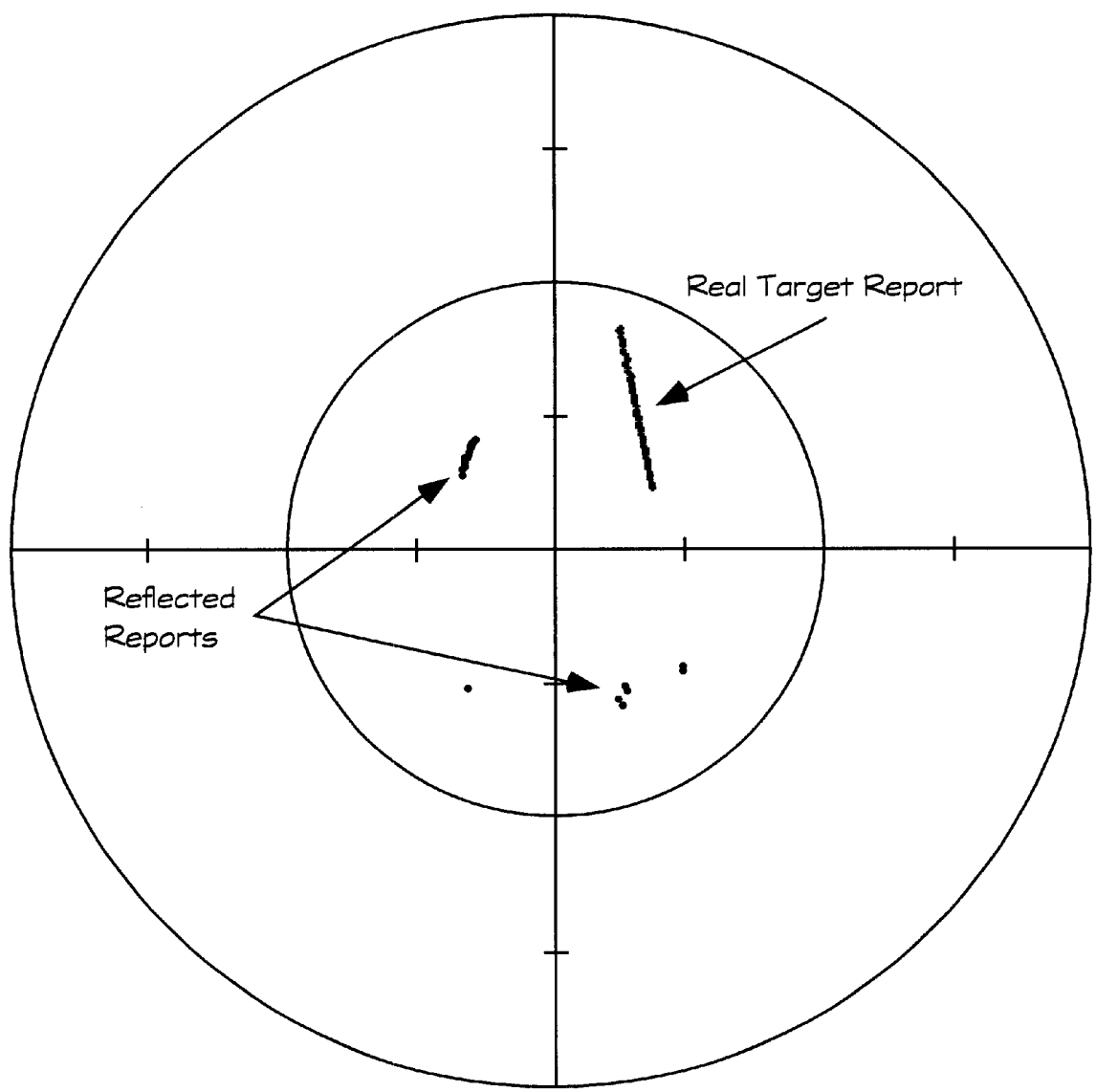
FIG. 1A–1C illustrate exemplary radar data for real targets and reflected targets recorded in accordance with the present invention.
Figure 1B:
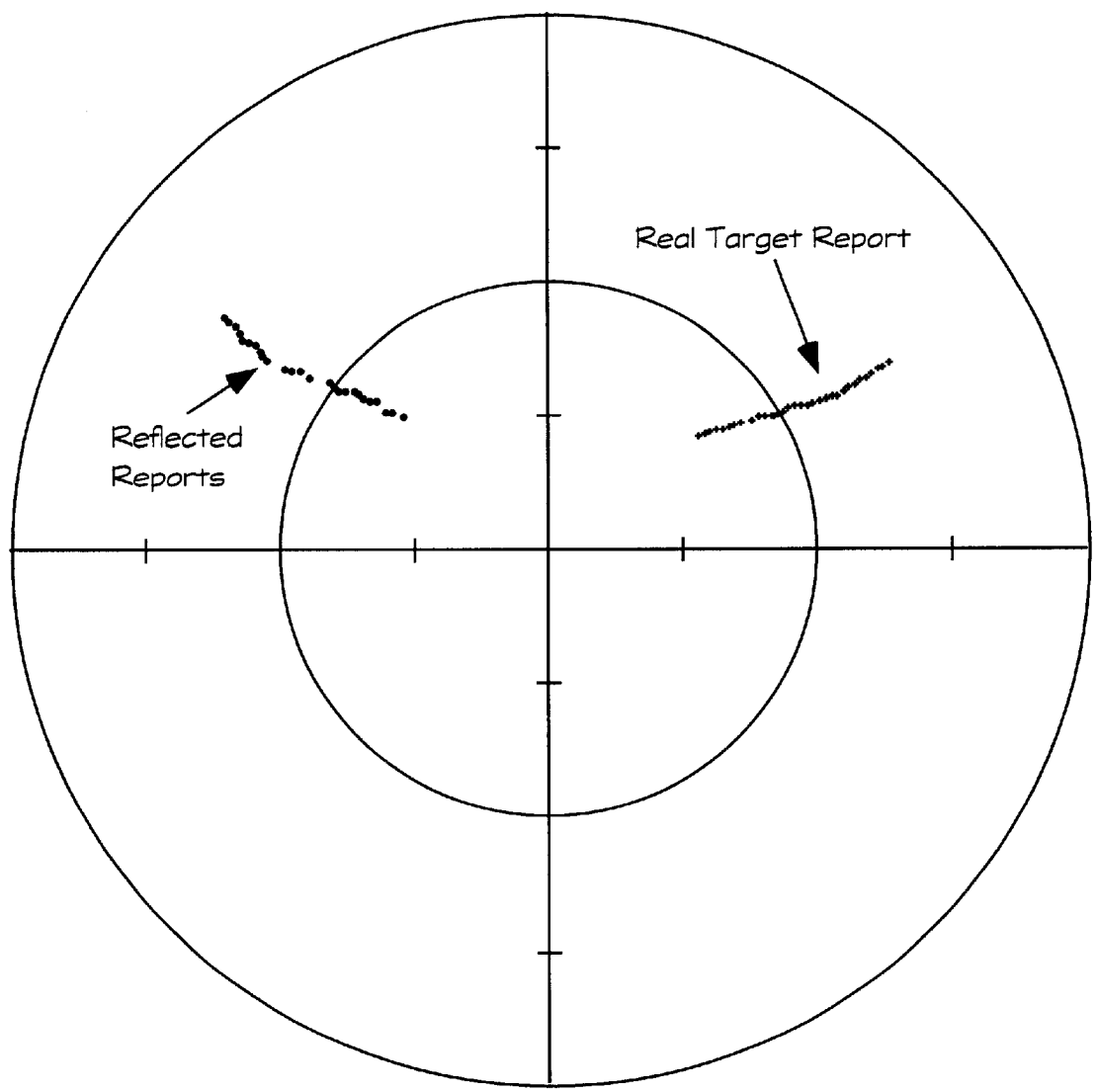
Figure 1C:
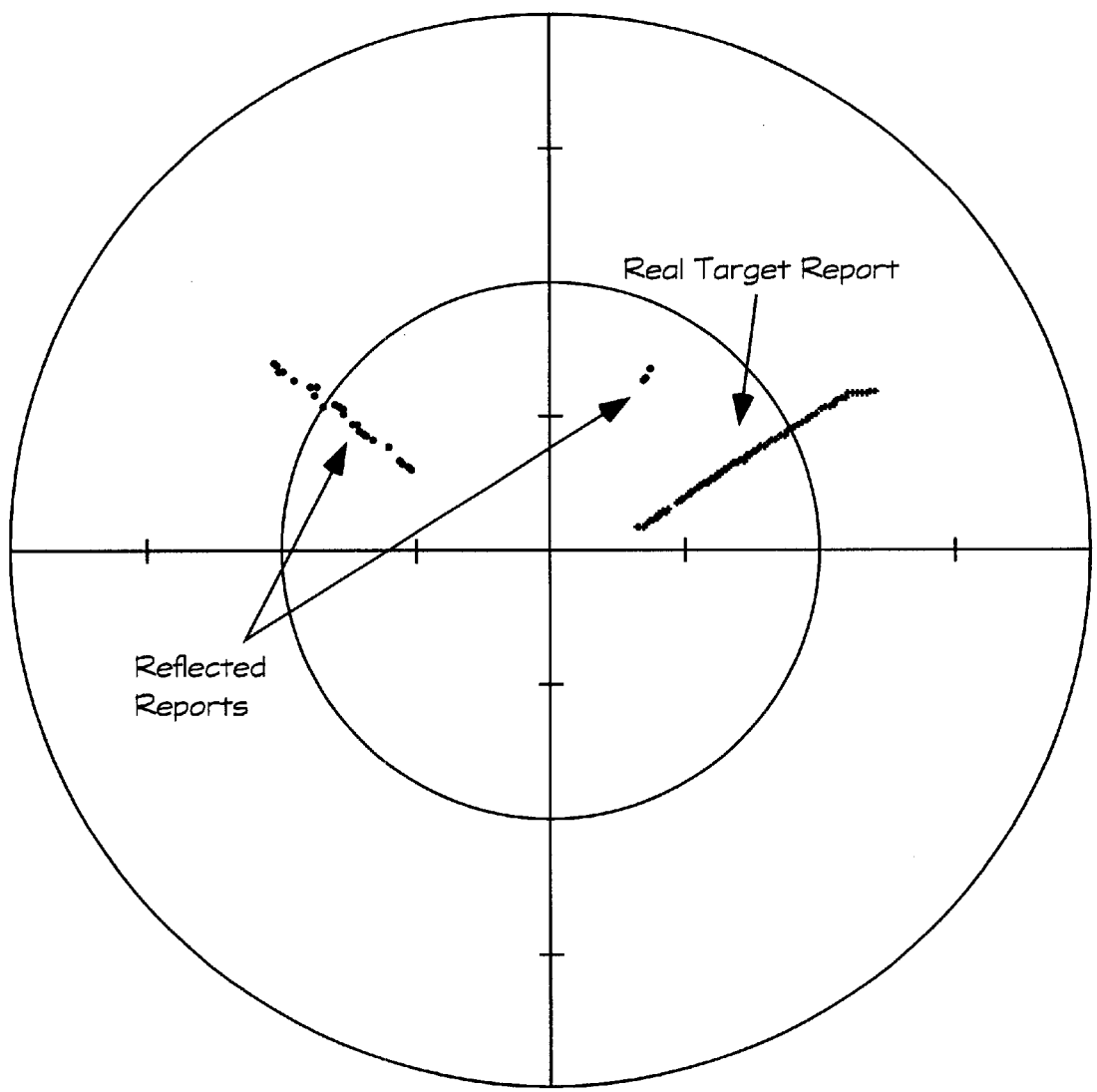

Exemplary radar scans are illustrated in FIGS. 1A–1C, which show three examples of one real target (each filtered by its Mode 3 code) reported several times during each antenna scan. The data is gathered during several antenna scans. Since only reports from one direction are the real target, the other reports represent reflected targets. In each example, a major reflected target is on the left side of the radar scan, indicating a possible reflector object in that direction.

Real and Reflected Target Range and Range Rate

Figure 2:
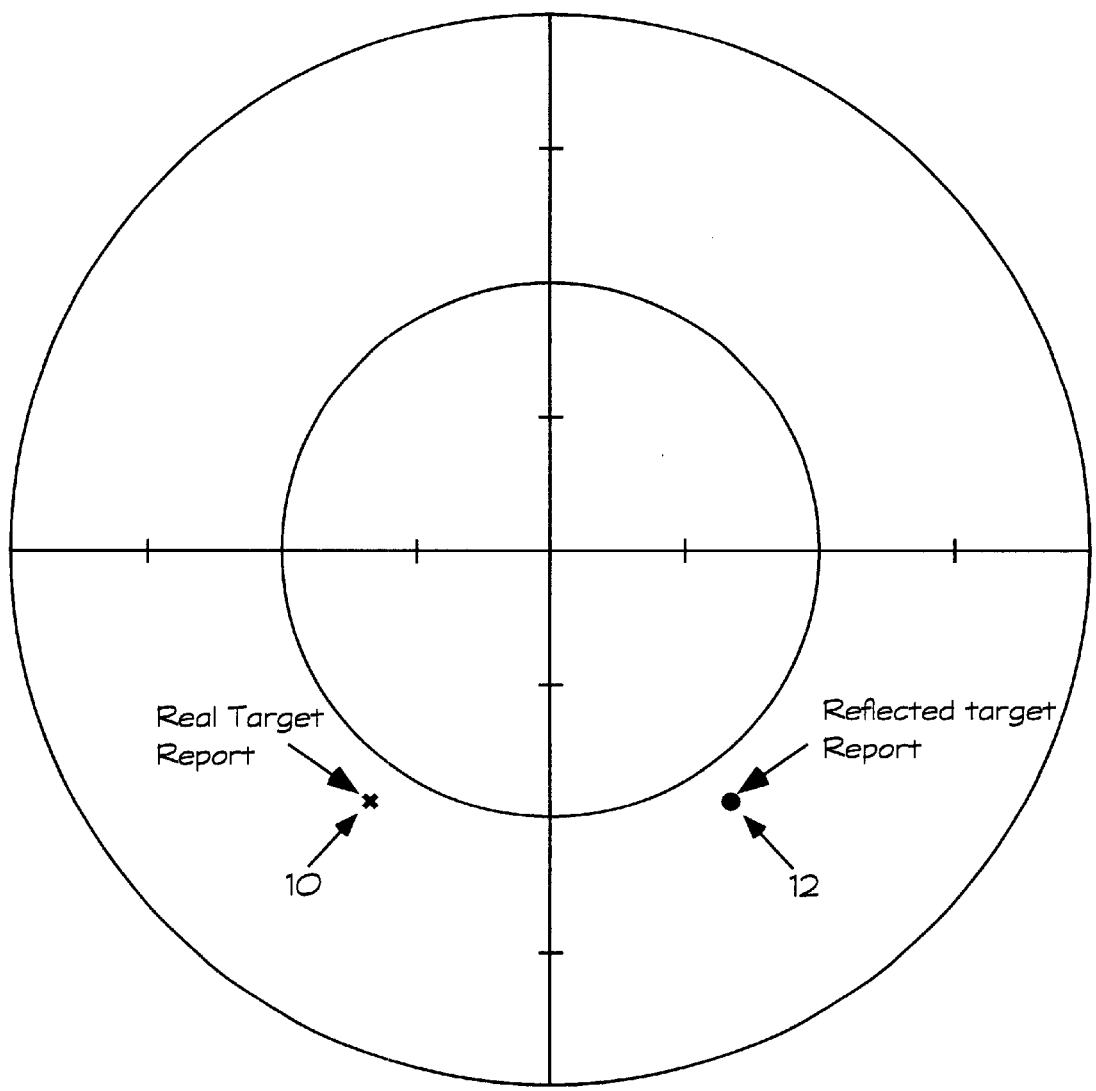
FIG. 2 illustrates radar data for real and reflected targets for the special case of parrot code 1276, which is a stationary target used for radar calibration.

FIG. 2 illustrates the special case of detection of a stationary transponder (not shown), which may be used to calibrate a radar system. There are two reports as indicated by an "X" mark 10 and a dot mark 12. The "X" mark 10 on the left side of FIG. 2 represents the transponder in its real location. The dot mark 12 on the right side of FIG. 2 represents a reflection of the transponder.

Figure 3:
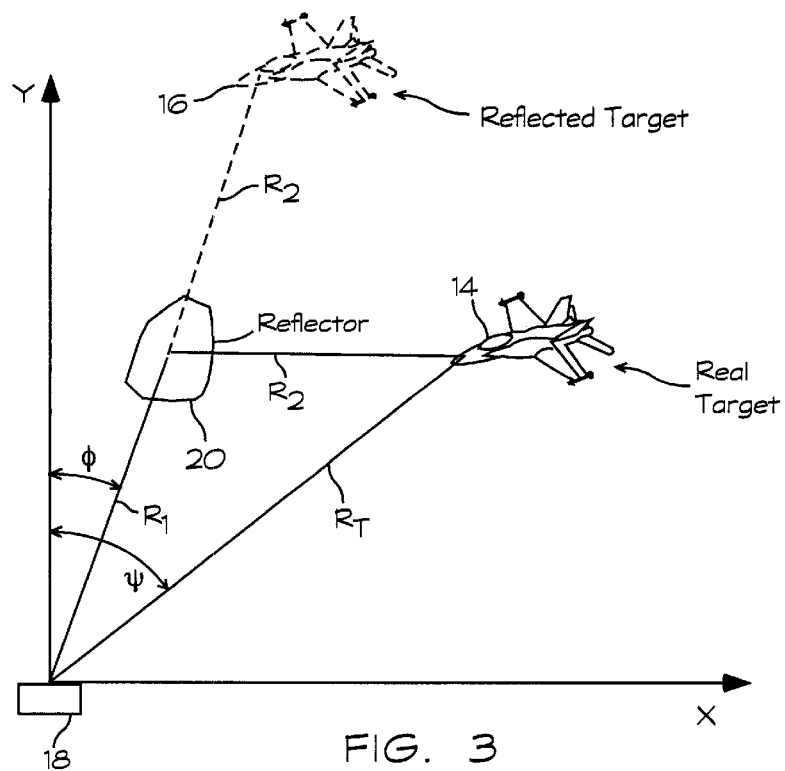
FIG. 3 illustrates a two-dimensional, simplified real and reflected target geometry.

FIG. 3 shows a simplified two-dimensional geometry for a real target 14 and a corresponding reflected target 16. As shown in FIG. 3, the reflected target 16 is generated when an electromagnetic wave from the interrogator 18 is reflected from a reflector object 20. The interrogator 18 includes a highly directional antenna (not shown) that is arranged to rotate about a vertical axis in a predetermined scan time. The directional antenna enables the radar system to make range and azimuth determinations for the real and reflected targets.

The reflector object 20 is shown at a range $R_1$ from the interrogator 18. The reflector object 20 is shown at a range $R_2$ from the reflected target 16. As indicated in FIG. 3, the distance $R_2$ is also the range of the real target 14 to the reflector object 20.

The reflected target 16 is thus detected at a range $R_{REF}$ from the interrogator 18.

$$R_{REF} = R_1 + R_2 \qquad (1)$$

The range $R_T$ is at an azimuth $\psi$ that is in a straight line from the interrogator 18 to the real target 14. The range $R_{REF}$ is at an azimuth $\phi$ that is in a straight line from the interrogator 18 to the reflector object 20. However, since the reflector object 20 may be any shape and size, the reflected target 16 may appear at any azimuth in a sector covered by the reflector object 20. As the real target 14 moves through the region where it receives radar signals that have been reflected from the reflector object 20, the reflected target 16 will change its position accordingly as shown in FIGS. 1A–1C.

Figure 4:
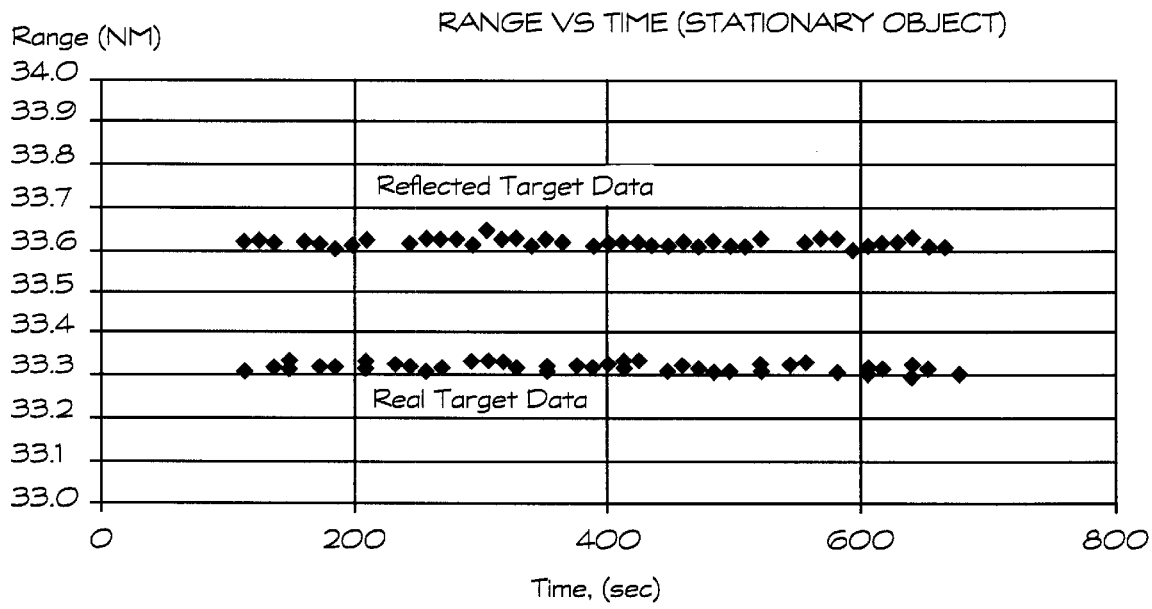
FIG. 4 graphically illustrates the range of real and reflected targets from a radar antenna as a function of time.

The range $R_{REF}$ of the reflected target 16 is always larger than the range $R_T$ of the real target 14 when referenced at the same time. This is best observed in the case of a real target that is not moving and thus does not need a time reference correction for distance comparison. FIG. 4 shows exemplary real and reflected target range data for the fixed target of FIG. 2. In the example of FIG. 4, the distance from the interrogator 18 to the reflected target 14 is about 0.3 NM larger than the distance to the real target 14. Any reflected target will have a greater range than its corresponding real target after any change in position due to time difference between receipt of SSR data for the real and reflected targets 14 and 16, respectively, is offset.

The difference between the range of the real target 14 and the reflected target 16 can be used to identify the real target 14 versus the reflected target 16 even in an early stage of target plot processing. Once the reflected target 16 is identified, it can be filtered out before being reported to the radar display (not shown) and system tracker (not shown). The location of the reflector object 20 can also be identified and used to reduce the number of false target reports. In some cases, the reflector object 20 may be masked, or even physically eliminated from the surveillance region.

Figure 7:
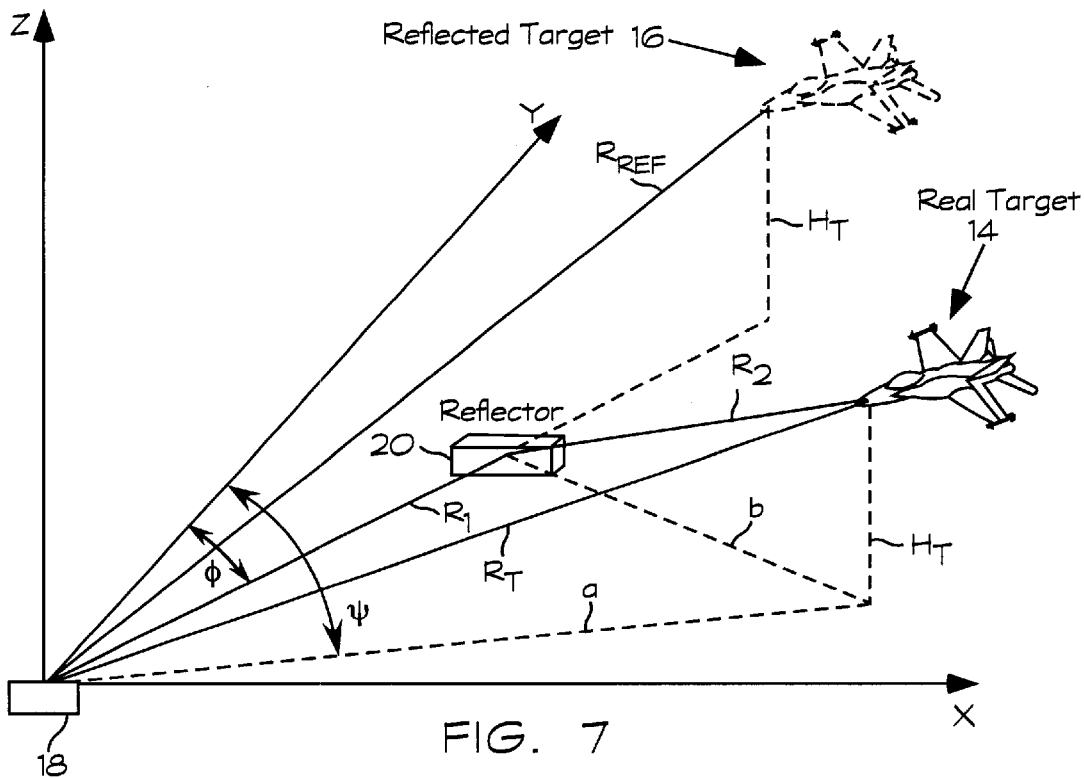
FIG. 7 illustrates a general case of real and reflected target geometry.

A general three-dimensional case of the relation between the real target 14 and the reflected target 16 is illustrated in FIG. 7. The reflected target data is generated when the electromagnetic radar wave is reflected from the reflector object 20 toward the real target 14. The reflected target data persists as long as the real target 14 maintains its position within an azimuth sector defined by the electromagnetic properties of the reflector object 20. Unfortunately, the azimuth sector is a parameter that is very difficult to predict. The azimuth sector depends on the shape, material, structure and orientation of the reflector object 20. Thus, modeling the azimuth sector is very difficult. Advantageously, the invention eliminates the need for extensive reflector object modeling. The present invention utilizes the real target 14 and the reflected target 16 information to reject the reflected target 16 and to characterize the reflector object 20.

Target reflection is considered to identified when more than one report with the same mode code is detected in a scan. That is true for all mode 2 and 3 codes except visual flight rules (VFR) code 1200 and all emergency codes that can be reported by multiple targets at the same time.

The present invention eliminates reflected targets from the radar display based on measuring a difference between the reflected target range $R_{REF}$ versus the real target range $R_T$, corrected for any time difference between measurements. The reflected target 16, which is always at a longer distance from the interrogator 18 than the real target 14, is eliminated, leaving only the plot of data for the real target 14 for display and processing.

In order to compare the distance of all targets they have to be referenced to the same time. Since the plot data does not contain velocity information, the radial velocity estimate is extracted from target range measurement. First, the system looks for a previous copy of the same report. When a copy is found, the current and range of the same target are used to calculate the radial velocity, or range rate of the target. The range rate of the reported target, V(n), at the current time may be written as:

$$V(n) = V(n-1) + \beta/T\ [R_M(n) - R_P(n)], \qquad (2)$$

where:

$R_M(n)$ is the measured target range at time n; $R_P(n)$ is the predicted target range at time n;

T is the difference in time from the last report (usually the time for one radar antenna scan); and $\beta$ is a processing constant.

The predicted target range at time n may be written as:

$$R_P(n) = R_S(n-1) + V(n-1)T \qquad (3)$$

where $R_S(n)$ is the target smoothed position at time n and n−1 indicates measurement at time n−1.

Figure 5:
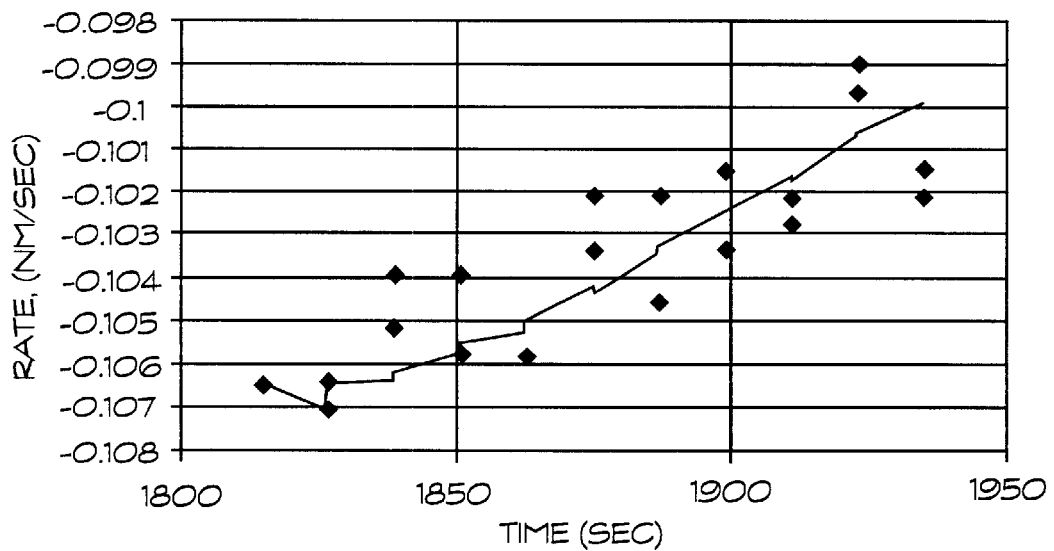
FIG. 5 graphically illustrates target velocity as a function of time.

The target smoothed position at time n may be written as:

$$R_S(n) = R_P(n) + \alpha[R_M(n) - R_P(n)] \qquad (4)$$

where $\alpha$ is a processing constant. The velocity of the real target 14 as a function of time is shown in FIG. 5. The solid line is the velocity calculated from Eq. (1), which provides a smoothed velocity estimate. The dotted marks in FIG. 5 represent the velocity calculated from two consecutive scans (range difference divided by the time elapsed).

Identify Reflected Targets

When a new target plot is received, it is tested for a possible code match to other targets in the database. If match is found with one or more targets stored in the data base, all database targets old range, are propagated to the new target time:

$$R_{old} = R'_{old} + V\Delta T \quad (5)$$

where V is the range rate calculate in Eq. (2) above and $R'_{old}$ is the range of the target at time (T–ΔT), where ΔT is the time elapsed between the new target report and the time of target in the database.

A range difference ΔR between the new report and each report in the database is then calculated:

$$\Delta R = R_{new} - R_{old}. \quad (6)$$

A new target is accepted as the real target if the calculated distance difference, ΔR, is the shortest distance of all targets tested (the most negative number). Otherwise the new target is rejected as being a reflected target. This value is compared to a preset threshold. The threshold value is based on the accuracy of the radar system. In a typical radar installation the threshold value is about 0.05 NM. The threshold value is chosen so that if there is any doubt about whether a target is real or reflected, it is accepted as real. This is a safety feature that insures that no real target is erroneously identified as being a reflection and eliminated from the radar-scope.

Figure 6:
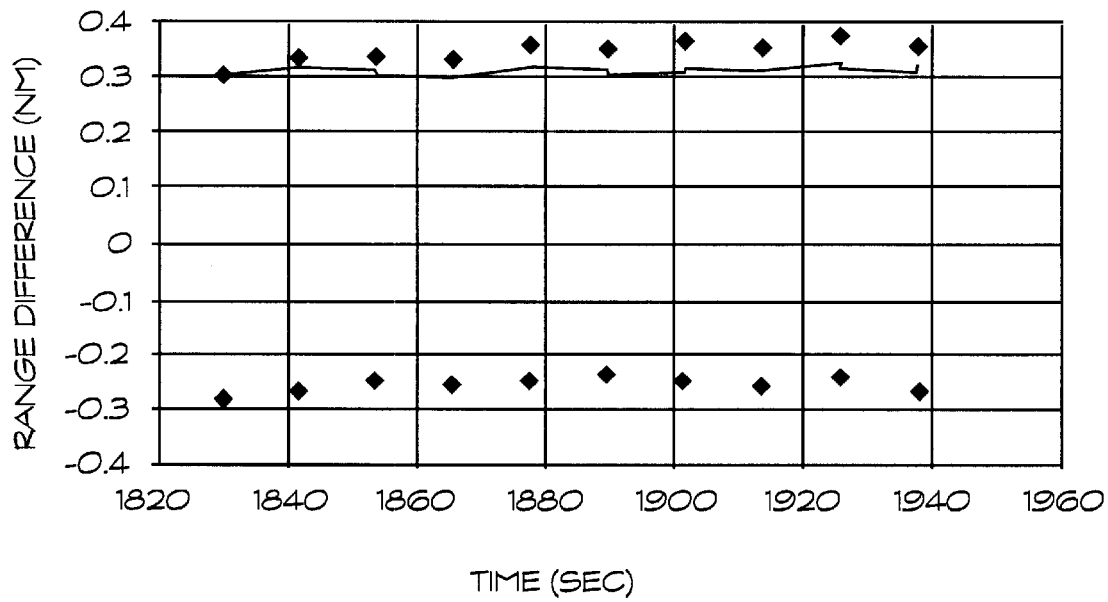
FIG. 6 graphically illustrates the range difference for successive plots of radar data for real and reflected targets.

Such a process was applied to the data of FIG. 1. The range difference, ΔR, between the new incoming target and a matching target in the database is shown in FIG. 6 as dots. Each time a real target is detected, the range difference ΔR to the old target is a negative number $\Delta R^-$ in accordance with Eq. (6). When the input target is a reflected target, the range difference is reported as a positive number $\Delta R^+$. Theoretically, the two values should be equal in magnitude and have opposite signs. Due to time, system noise and velocity errors, the ΔR values may fluctuate. To offset this fluctuation error, the negative number $\Delta R^-$ and the positive number $\Delta R^+$ may be combined to give a more accurate value for the range difference, which may be written as:

$$\Delta R = \tfrac{1}{2}(\Delta R^+ - \Delta R^-). \quad (7)$$

This final ΔR is shown as a solid line in FIG. 6.

Reflector Mapping.

As set forth in U.S. Federal Aviation Administration (FAA) specifications FAA-E-2716, dated Mar. 24, 1983, reflector object coordinates and position are needed for the mode S reflected target detection process. In a standard FAA installation, a database on reflector objects is provided as part of the installation information, and the reflected targets are identified using this data. The mapping of reflector objects described herein builds the reflector object database using targets already sorted as real and reflected targets, which saves having to conduct a lengthy test program. This reflector object database can be provided to a system processor (not shown) included in the radar system (not shown) to reduce reflected targets in sectors known for high level of reflectors objects.

The location of the reflector object 20 can be calculated from positions of the real target 14 and the reflected target 16. As illustrated in FIG. 7, the reflector object 20 and the interrogator 18 are located on the X-Y plane because it is assumed that the interrogator 18 and the reflector object 20 are located on or near the same plane. The reflector object 20 is at a distance $R_1$ from the interrogator 18 and azimuth φ from the Y-axis. The real target 14 is a distance $R_2$ from the reflector object 20 and a height $H_T$ above the X-Y plane. The real target 14 is at an azimuth ψ from the Y-axis. The reflected target 16 will be displayed at a range $R_{REF}$ from the interrogator 18 and will be reported at the same height $H_T$ as the real target 14. In FIG. 7 "a" indicates a projection of the real target range $R_T$ in the X-Y plane, and "b" is a projection of the distance $R_2$ in the X-Y plane.

The geometrical relationships shown in FIG. 7 may be written as:

$$b^2 = R_1^2 + a^2 - 2R_1 a \cos(\psi - \phi), \quad (8)$$

$$a^2 = R_T^2 - H_T^2, \quad (9)$$

and $$b^2 = R_2^2 - H_T^2. \quad (10)$$

The reflected target 16 is always displayed at a distance from the interrogator 18 that is equal to the total distance that the electromagnetic wave travels from the interrogator 18 to the reflector object 20 and to the real target 14. This distance is given by $$R_{REF} = R_2 + R_1 \quad (11)$$

where $R_{REF}$ is the range from the interrogator 18 to the reflected target 16 as reported by the radar system (not shown).

Thus, inserting Eqs. (9), (10) and (11) into Eq. (7) gives the following result:

$$(R_{REF} - R_1)^2 - H_T^2 = R_1^2 + R_T^2 - H_T^2 - 2R_1\sqrt{R_T^2 - H_T^2}\cos(\psi - \phi). \quad (12)$$

Solving Eq. (12) for $R_1$, (the range of the reflector object 20 to the radar interrogator 18) yields:

$$R_1 = \frac{R_{REF}^2 - R_T^2}{2\left[R_{REF} - \sqrt{R_T^2 - H_T^2}\cos(\psi - \phi)\right]}. \quad (13)$$

The coordinates of the reflector object 20 in the X-Y plane centered at the interrogator site of the interrogator 18 are given by:

$$X = R_1 \sin \phi \quad (14)$$

and $$Y = R_1 \cos \phi. \quad (15)$$

Thus for each pair of targets identified as real and reflected targets, the reflector coordinates can be calculated and marked on the screen. As targets move across the surveillance region and more data is collected, the parameters of all reflector objects in the surveillance region can be identified.

Determine Reflector Facing Angle

Figure 8:
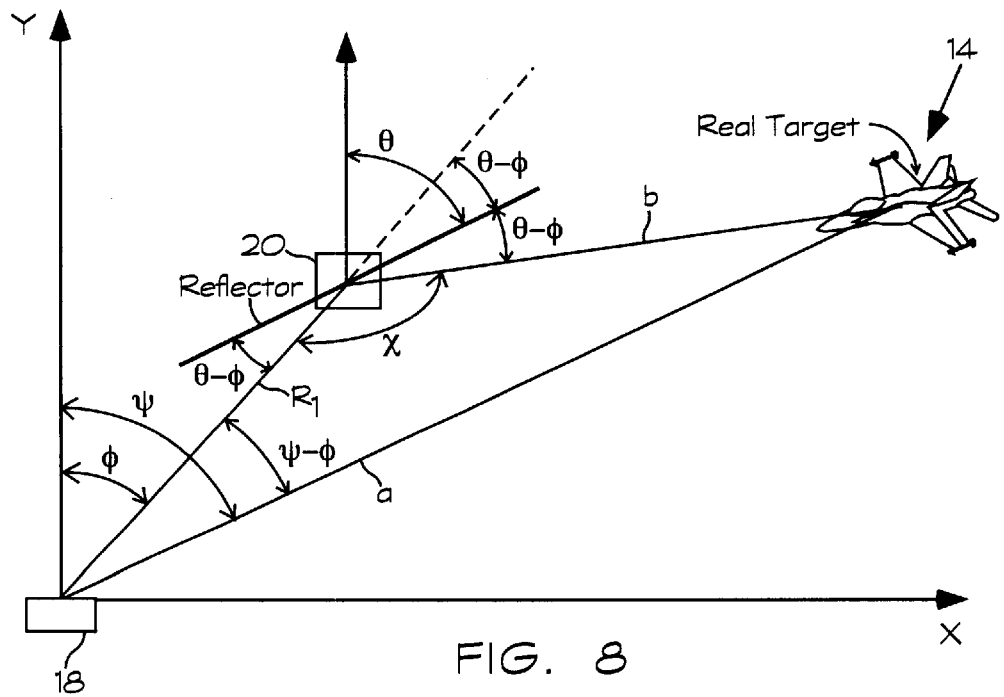
FIG. 8 illustrates the facing angle of a reflector object in the X, Y plane as may be determined in accordance with the present invention.

A facing angle θ of the reflector object 20 in the X-Y plane may be calculated from the geometry illustrated in FIG. 8, which is the X-Y projection of FIG. 7. From the geometry given above, the reflector facing, θ, can be calculated from the azimuth φ to the reflected target, the azimuth ψ to real target, the distances $R_1$, and "a" and "b". The expressions for "a" and "b" are given in Eqs. (8) and (9). There is an angle χ between the distance $R_1$ from the interrogator 18 to the reflector object 20 and the distance "b" from the reflector object 20 to the real target 14. These distances and angles are illustrated in FIG. 8.

The angles θ, ψ and χ are related by the following equation:

$$2(\theta - \psi) + \chi = \pi. \quad (16)$$

Solving for the reflector facing angle θ gives:

$$\theta = \pi - \chi/2 + \psi. \quad (17)$$

The angle χ may be calculated from the expression:

$$\chi = \arcsin[a/b \, \sin(\psi - \phi)]. \quad (18)$$

where "a and "b" may be calculated using Eqs. (9) and (10). Thus the reflector facing angle may be written using readily available parameters as:

$$\theta = \frac{1}{2}\left(\pi - \arcsin\left[\frac{\sqrt{R_T^2 - H_T^2}}{\sqrt{R_2^2 - H_T^2}}\sin(\psi - \phi)\right]\right) + \psi. \quad (19)$$

In order to reduce false reflector object reports, an object is declared to be a reflector object only when it is reported at least three times in a grid of 0.2 NM and 1° in the surveillance region.

Figure 9:
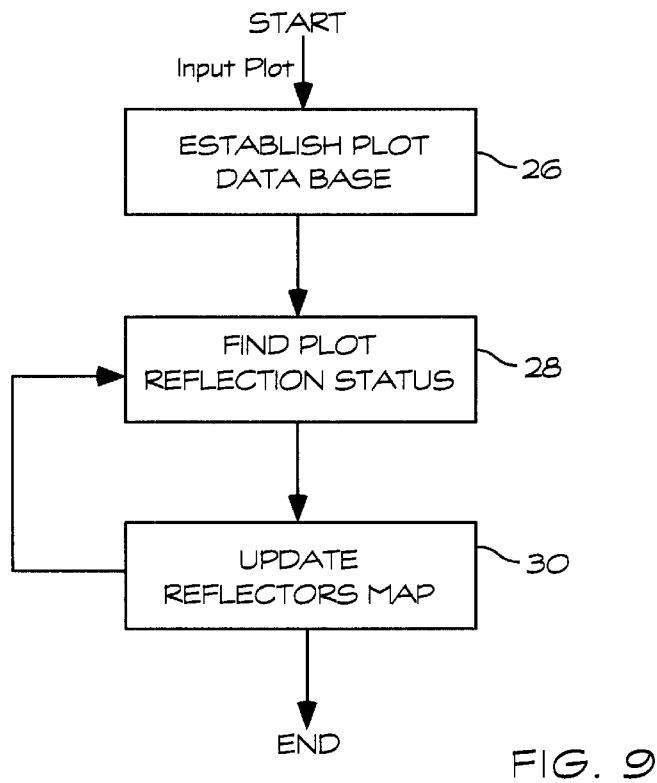
FIG. 9 is a top-level flow chart of an algorithm in accordance with the present invention.

FIG. 9 illustrates a basic top-level process according to the present invention. The top-level process includes three main processes that contain all the functions of the present invention. First, an Establish Plot Database 26 process receives an input plot of radar data to store in the system database. In the Establish Plot Database process 26, the input plot of radar data is correlated against existing data to update the system database and to generate a smoothed range and range rate in accordance with Eq. (2).

A Find Plot Reflection Status process 28 uses the updated database information from the Establish Plot Database 26 to calculate the distance from the interrogator 18 for all correlated tracks to determine whether the input plot represents a real target or a reflected target. For each correlated track, the distance from the interrogator 18 is determined using Eqs. (3)–(5).

An Update Reflectors Map function 30 receives the plot reflection status and updates the reflector map for each new incoming plot. The coordinates of each identified reflector are determined using Eqs. (13)–(15). The facing angle of each reflector is determined using Eq. (19). The reflectors map is used to provide a better identification of possible reflector objects.

Figure 10:
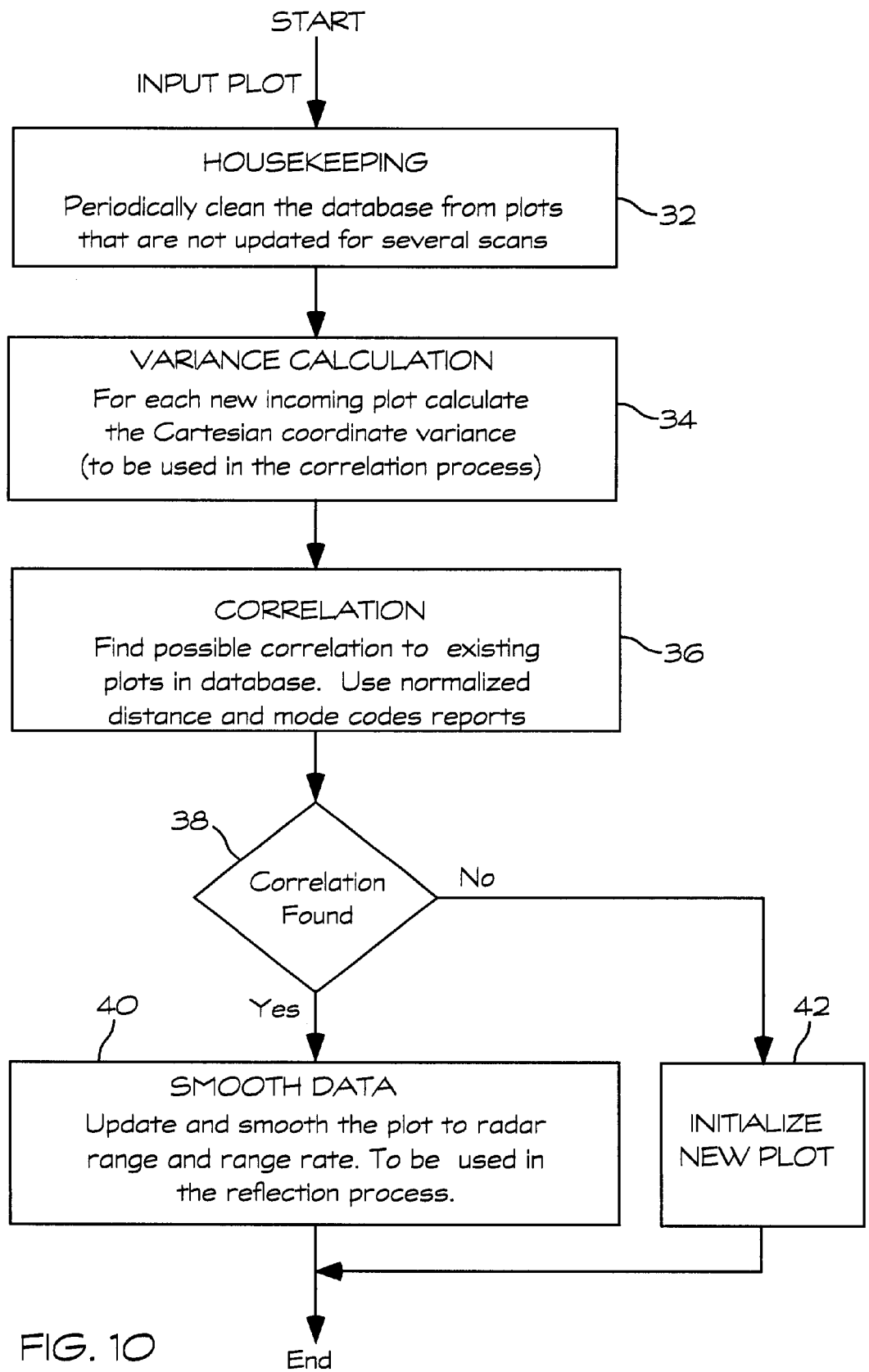
FIG. 10 is a flow chart of a method according to the present invention for establishing a plot database for reflected targets.

FIG. 10 shows process steps that may be used to implement the Establish Plot Database process 26 of FIG. 9. A Housekeeping process 32 periodically purges the database to remove plots that are not updated for several scans, which indicates that the targets corresponding to these plots are no longer in the surveillance region.

New data in the database is input to a Variance Calculation process 34. The Variance Calculation process 34 determines the variance of the Cartesian coordinates for each plot for use in the correlation process.

The variance of the coordinates is input to a Correlation process 36. The variance is used to determine whether points on plots that are near one another on the radar display are for the same target or different targets. The Correlation process 36 attempts to correlate each new plot of target data with plots of target data already in the database using normalized distance from the interrogator 18, antenna scan time and mode codes reports.

If a Correlation Found step 38 indicates that a correlation was found, then a Smooth Data process 40 updates the target database and smooths the range from the interrogator 18 and range rate for use in other processes that are described subsequently herein. If the Correlation Found step 40 indicates that no correlation was found, then an Initialize process 42 initializes a new target position in the target database.

Figure 11:
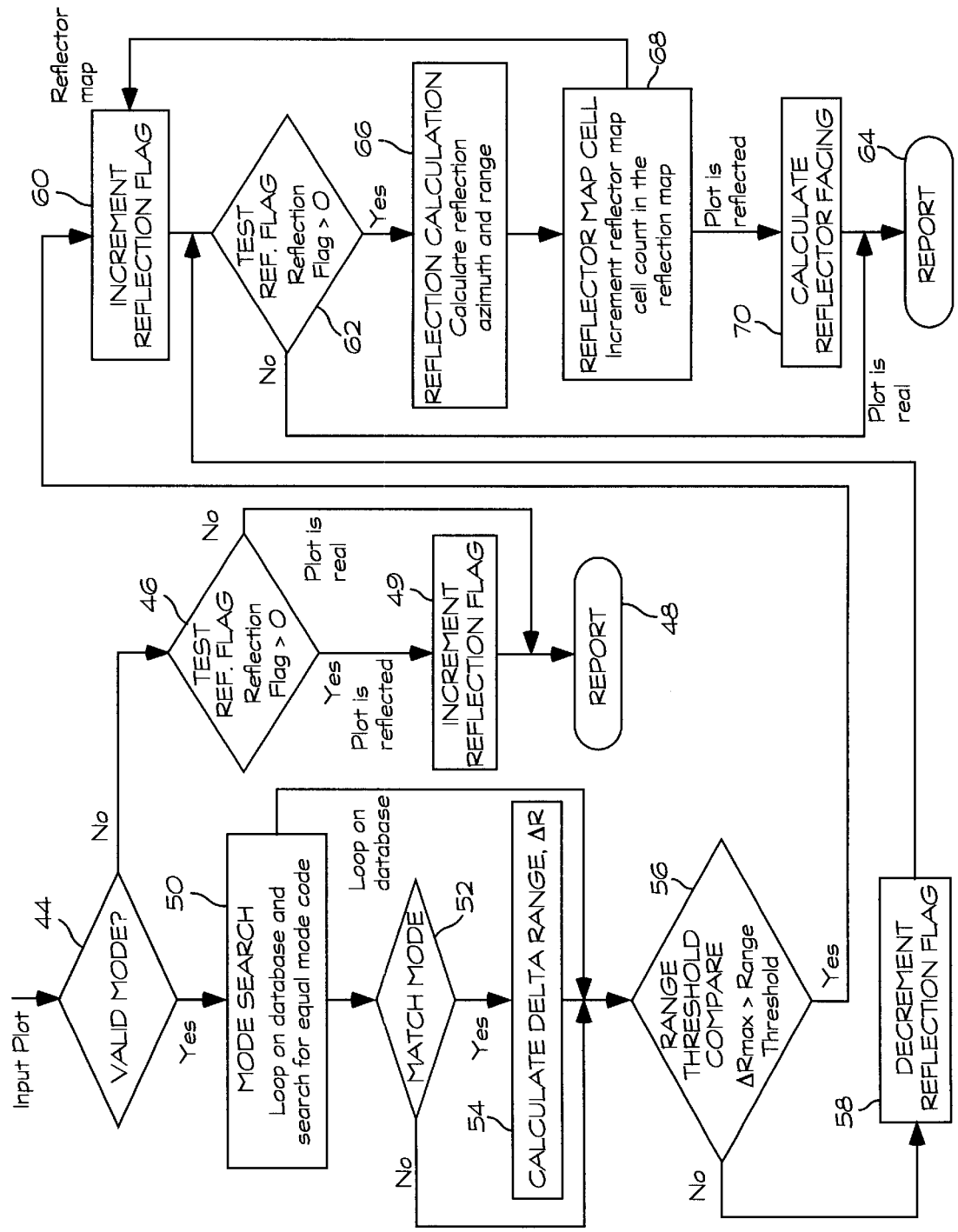
FIG. 11 is a flow chart of a method according to the present invention for identifying reflected targets and updating a map of reflector objects.

FIG. 11 shows process steps that may be used to implement the Find Plot Reflection Status process 28 and the Update Reflectors Map process 30 of FIG. 9. Each plot of target data stored in the database has a corresponding reflection flag, which is a number that indicates how many times the plot has been reported to be a reflection. Each time the particular target is reported to be a reflection, the reflection flag is incremented. Each time the same target is reported to be a real target, the reflection flag is decremented.

The input plot from the target includes a mode code. A Valid Mode process 44 examines the input plot of target data to determine whether it contains at least one valid mode code. If there is no valid mode in the input plot, then a Test Reflection Flag process 46 determines whether the plot has a reflection flag that is greater than zero. If the reflection flag is not greater than zero, the plot is accepted as real. If the reflection flag is greater than zero, the plot is classified as a reflection; and an Increment Reflection Flag process 47 increments the reflection flag by 1. A Report process step 48 then reports the plot represents a real target or a reflected target.

If the valid mode process 44 reports at least one valid mode code in the input plot, a Mode Search process 50 is implemented by looping on the target database and searching for a mode code equal to the mode code of the input plot. If a Match Mode process 52 finds a matching mode code in the same radar scan as the input plot, then a Calculate Delta Range process 54 calculates the range difference ΔR using Eq. (6). The difference between the range of the input target data plot from the interrogator 18 and the range from the interrogator 18 of each target found in the database having the same mode code is determined. These range differences are compared to determine the maximum range difference $\Delta R_{max}$ between the range of the input target plot and the target plots in the database having the same mode code as the input target plot. The maximum range difference $\Delta R_{max}$ is stored. A Range Threshold Compare process 56 compares the stored maximum range difference $\Delta R_{max}$ are then compared to a range threshold. If the Match Mode process 52 finds no plot in the database having a mode code that matches the mode code of the input plot, the Calculate Delta Range process 54 is bypassed.

If the maximum range difference $\Delta R_{max}$ is not greater than a predetermined range threshold, then a Decrement Reflection Flag 58 process decrements the reflector flag. If the Range Threshold Compare process 56 indicates that maximum range difference $\Delta R_{max}$ is greater than the range threshold, then an Increment Reflection Flag process 60 increments the reflection flag.

After the reflection flag is either decremented of incremented, the invention next uses a Test Reflection Flag process 62 to determine whether the reflection flag is greater than zero. If the reflection flag is not greater than zero, a Report step 64 reports that the incoming target data plot is accepted as representing a real target. If the reflection flag is greater than zero, then a Reflection Calculation process 62 calculates the reflection range and azimuth using Eqs. (13) and (19). Next, a Reflector Map Cell process 68 increments the reflector map cell count, and the Report step 64 indicates that the incoming target data plot is represents a reflected target.

The process then calculates the facing angle of each object that has been identified as being a reflector object using Eq. (19).

In tests of the invention conducted on recorded data from three different locations, the invention rejected more than 95% of the reflected targets while maintaining better than 99% probability of reporting real targets. The reflector mapping function provides a consistent indication of all major reflectors in the surveillance area.

Figure 13:
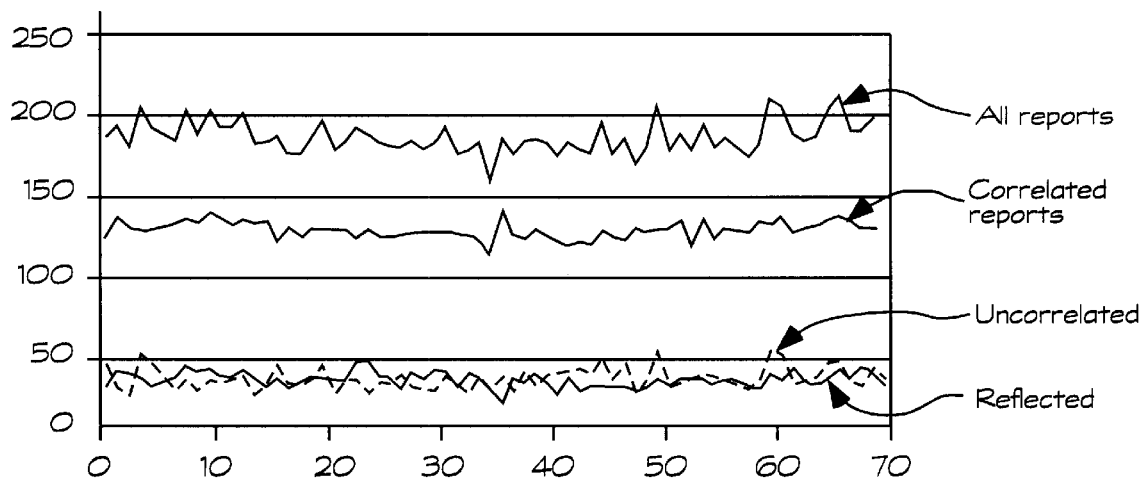
FIG. 13 graphically illustrates the number of correlated, uncorrelated and reflected targets in an exemplary radar scan.
Figure 12:
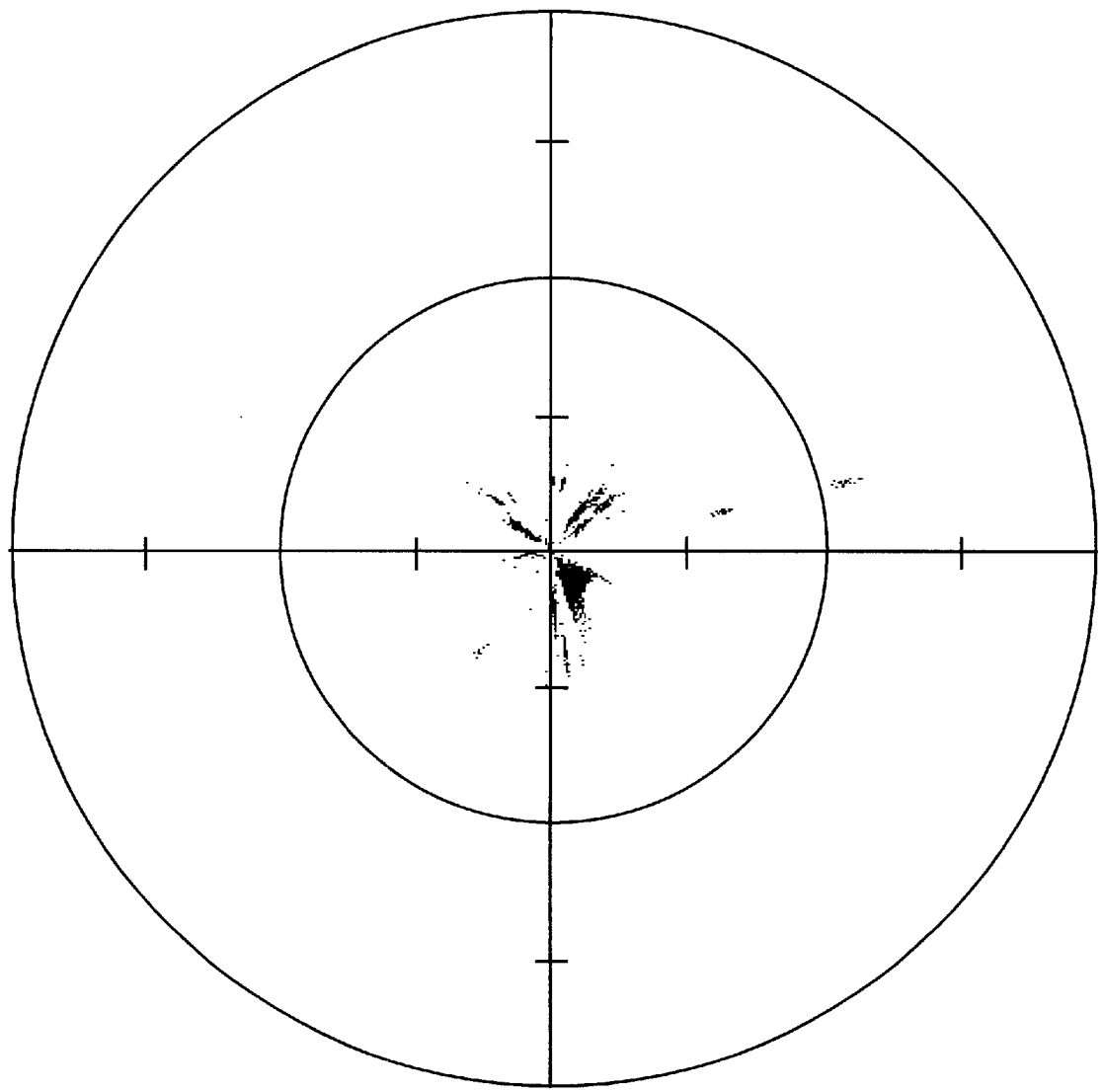
FIG. 12 illustrates a reflector map obtained with the method according to the present invention.

The result of the reflected target rejection is illustrated in FIGS. 1A–1C. The real targets are maintained while the reflected target will be rejected. FIG. 12 shows the results of the reflector object mapping. The reflector objects are mapped based on real and reflected target detection in accordance with the invention as described above. FIG. 13 shows all reports, the correlated, uncorrelated and reflected reports for a number of scans.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A method for identifying false target signals on a radar display caused by reflection of radar signals from a reflector object in a surveillance region using a radar system that includes a radar interrogator comprised of a radar transmitter/receiver arranged to display plots of radar signals that indicate positions of targets in the surveillance region, comprising the steps of:

obtaining a first plot of radar data for target position at a first time;

obtaining a second plot of radar data for target position at a second time;

comparing the first and second plots of radar data to determine whether they represent multiple reports of a single target or whether they represent different targets;

determining a first range from the radar interrogator for the first plot of radar data if the first and second plots of radar data represent multiple reports of a single target;

determining a second range from the radar interrogator for the second plot of radar data if the first and second plots of radar data represent multiple reports of a single target;

comparing the first and second ranges to determine which has the larger magnitude; and identifying the plot of radar data having the larger range as being a false target signal.

2. The method of claim 1, wherein the step of comparing the first and second plots of radar data comprises the steps of:

subtracting the first time from the second time to obtain a time difference for the first and second plots of radar data;

calculating a target velocity for the second plot of radar data; and using the target velocity of the second plot of radar data and the time difference to propagate the range for the second plot of radar data to the same time as the first plot of radar data.

3. The method of claim 2 further including the steps of:

subtracting the first range from the second range to determine a range difference;

comparing the range difference to a threshold; and identifying the second plot of radar data as being a false target signal if the range difference exceeds the threshold.

4. The method of claim 3, further including the step of calculating a normalized range from the interrogator for each new plot of radar data received by the interrogator.

5. The method of claim 1, further including the step of processing signals input to the radar display to block false target signals that have been identified.

6. A method for identifying false target signals caused by reflection of radar signals from a reflector object in a surveillance region using an air traffic control radar system that includes a radar interrogator formed to comprise a radar transmitter/receiver arranged to display plots of radar signals that indicate positions of targets and to process mode code radar signals from the targets that identify each target, comprising the steps of:

producing a first plot of radar data for the position of a first target having a selected mode code;

producing a second plot of radar data for the position of a second target having the selected mode code, thus indicating that the first and second plots of radar data are multiple reports of a single target;

determining a first range from the radar interrogator for the first plot of radar data;

determining a second range from the radar interrogator for the second first plot of radar data;

subtracting the first range from the second range to provide a range difference; and identifying the plot of radar data having the larger range as being a false target signal.

7. The method of claim 6, further comprising the steps of:

measuring an azimuth, a range and an altitude for each of the first and second targets; and calculating a range of the reflector object from the interrogator as a function of the azimuth, range, and altitude measurements.

8. The method of claim 7, further including the step of calculating a facing angle of the reflector object relative to the interrogator as a function of the azimuth, range, and altitude measurements.

9. The method of claim 7, further including the step of storing the range of the reflector object from the interrogator and the facing angle of the reflector object in a database.

10. The method of claim 9, further including the step of storing each plot of radar data formed by the radar system in the database.

11. The method of claim 10, further including the steps of:

forming a new plot of radar data for the position of an incoming target;

calculating a range difference between the incoming target and each target in the database for which there is a mode code match with the incoming target to determine whether the new plot is a false target signal; and initializing a new plot position in the database if the incoming target does not have a mode code match with an existing target in the database.

12. The method of claim 11, further including the steps of:

determining a range from the radar interrogator for the incoming target;

comparing the range for the incoming target to range data stored in the database for other targets having the same mode code as the incoming target to determine a maximum range difference; and identifying the new plot of radar data as being a false target signal if the maximum range difference is greater than a threshold.

13. The method of claim 10, further including the step of calculating a normalized range from the radar for each new plot of radar data received by the interrogator.

14. A method for identifying false target signals caused by reflection of radar signals from a reflector object in a surveillance region using an air traffic control radar system that includes a radar interrogator formed to comprise a radar transmitter/receiver arranged to display plots of radar signals that indicate positions of targets and to process mode code radar signals from the targets that identify each target, the radar interrogator being arranged to rotate so that it scans the surveillance region in a scan time, comprising the steps of:

producing a first plot of radar data for coordinates of a first target having a selected mode code as a function of time;

producing a second plot of radar data for coordinates of a second target having the selected mode code as a function of time;

propagating the coordinates of the first and second plots to a common time;

determining a range from the interrogator to the first target;

determining a range from the interrogator to the second target; and identifying the plot of radar data having the larger range as being a false target signal.

15. The method of claim 13 wherein the step of propagating the coordinates of the first and second plots to a common time comprises the steps of:

generating a velocity for the second target;

determining a time difference for corresponding coordinates in the first and second plot of radar data.

using the velocity and time difference to propagate the second plot of radar data to the same time as the first plot of radar data.

16. The method of claim 13, further including the step of updating the database to remove data for plots of radar data for targets that do not appear on the display in a predetermined time interval.

17. The method of claim 15 wherein the predetermined time interval is a selected multiple of the scan time.

* * * * *